(12) United States Patent
DaQuino et al.

(10) Patent No.: US 7,128,398 B2
(45) Date of Patent: *Oct. 31, 2006

(54) PULSE JET PRINT HEAD ASSEMBLY HAVING MULTIPLE RESERVOIRS AND METHODS FOR USE IN THE MANUFACTURE OF BIOPOLYMERIC ARRAYS

(75) Inventors: Lawrence J. DaQuino, Los Gatos, CA (US); Yat-Kwong Ip, San Jose, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/200,652

(22) Filed: Aug. 9, 2005

(65) Prior Publication Data

US 2006/0028509 A1    Feb. 9, 2006

Related U.S. Application Data

(63) Continuation of application No. 10/022,088, filed on Dec. 18, 2001, now Pat. No. 6,935,727.

(51) Int. Cl.
*B41J 2/14* (2006.01)
*B41J 2/05* (2006.01)

(52) U.S. Cl. .......................................... 347/49; 347/63
(58) Field of Classification Search ............... 347/20, 347/40, 49, 63
See application file for complete search history.

(56) References Cited

U.S. PATENT DOCUMENTS

| | | |
|---|---|---|
| 4,500,895 A | 2/1985 | Buck et al. |
| 4,771,295 A | 9/1988 | Baker et al. |
| 4,877,745 A | 10/1989 | Hayes et al. |
| 5,278,584 A | 1/1994 | Keefe et al. |
| 5,305,015 A | 4/1994 | Schantz et al. |
| 5,449,754 A | 9/1995 | Nishioka |
| 5,474,796 A | 12/1995 | Brennan |
| 5,658,802 A | 8/1997 | Hayes et al. |
| 5,681,757 A | 10/1997 | Hayes |
| 5,700,637 A | 12/1997 | Southern |
| 5,719,605 A | 2/1998 | Anderson et al. |
| 5,874,554 A | 2/1999 | Gamble et al. |
| 5,900,892 A | 5/1999 | Mantell et al. |
| 5,958,342 A | 9/1999 | Gamble et al. |
| 6,155,675 A | 12/2000 | Nice et al. |
| 6,155,676 A | 12/2000 | Etheridge et al. |
| 6,183,067 B1 | 2/2001 | Matta |
| 6,221,653 B1 | 4/2001 | Caren et al. |
| 6,228,659 B1 | 5/2001 | Kowallis et al. |
| 6,242,266 B1 | 6/2001 | Schleifer et al. |
| 6,250,738 B1 | 6/2001 | Waller et al. |
| 6,290,331 B1 | 9/2001 | Agarwal et al. |
| 6,412,921 B1 | 7/2002 | Manini |
| 6,935,727 B1 * | 8/2005 | DaQuino et al. ............. 347/63 |

* cited by examiner

*Primary Examiner*—An H. Do

(57) ABSTRACT

Pulse jet printhead assemblies having multiple reservoirs and multiple printhead dies, as well as methods for their use in the deposition of fluids, typically fluids containing a biopolymer or precursor thereof, onto a substrate surface, are provided. The subject printheads are characterized by having a multiple printhead die printhead and a multiple reservoir housing affixed to the multiple die printhead. In using the subject printhead assemblies, the firing chambers of the printhead assembly are loaded with a volume of fluid that includes a biopolymer or precursor thereof. The loaded printhead assembly is then placed in opposing relation to a surface of a substrate and actuated to deposit a volume of fluid on the substrate. The subject printhead assemblies find use in a variety of applications, including the production of biopolymeric arrays.

30 Claims, 4 Drawing Sheets

PULSE JET PRINT HEAD ASSEMBLY HAVING MULTIPLE RESERVOIRS AND METHODS FOR USE IN THE MANUFACTURE OF BIOPOLYMERIC ARRAYS

CROSS-REFERENCE TO RELATED APPLICATIONS

This application is a continuation of application Ser. No. 10/022,088 filed on Dec. 18, 2001 and now issued as U.S. Pat. No. 6,935,727; the disclosures of which is herein incorporated by reference.

INTRODUCTION

1. Field of the Invention

The field of this invention is biopolymeric microarrays, and particularly devices for producing such arrays.

2. Background of the Invention

Arrays of biopolymeric binding agents, such as oligonucleotides and peptides, have become an increasingly important tool in the biotechnology industry and related fields. These binding agent arrays, in which a plurality of binding agents are present on a solid support surface in the form of an array or pattern, find use in a variety of applications, including genomomics and proteomics applications, e.g., gene expression analysis, drug screening, nucleic acid sequencing, mutation analysis, proteome analysis, and the like.

Such arrays may be prepared in a number of different ways. For example, DNA arrays may be prepared manually by spotting DNA onto the surface of a substrate with a micro pipette. See Khrapko et al., DNA Sequence (1991) 1:375–388. Alternatively, the dot-blot approach, as well as the derivative slot-blot approach, may be employed in which a vacuum manifold transfers aqueous DNA samples from a plurality of wells to a substrate surface. In yet another method of producing arrays of biopolymeric molecules, a pin is dipped into a fluid sample of the biopolymeric compound and then contacted with the substrate surface. By using a plurality or array of pins, one can transfer a plurality of samples to the substrate surface at the same time. Alternatively, an array of capillaries can be used to produce biopolymeric arrays. See WO 95/35505. In another method of producing biopolymeric arrays, arrays of biopolymeric agents are "grown" on the surface of a substrate in discreet regions. See e.g. U.S. Pat. No. 5,143,854 and Fodor et al., Science (1991) 251:767–773.

One type of biopolymeric array fabrication process of particular interest is the jet printing fabrication protocol, in which thermal or piezo pulse jet devices analogous to inkjet printing devices are employed to deposit fluids of biopolymers or precursors therefore onto a substrate surface. For example, Roda et al., Biotechniques (2000) 28:492–496, describe a method in which a conventional inkjet printer is used for the microdeposition of proteins. In this report, the black ink was removed from a Hewlett Packard ink cartridge and the cartridge was extensively washed with water. The cartridge was filled with the protein deposition solution using a microsyringe and sealed. Similarly, Deeg et al. in U.S. Pat. No. 5,338,688, describe a method of using bubble-jet technology for the metered application of an analytical liquid to a target. This disclosed method is based on the manufacture of disposable jet units containing the analytical liquid in prepacked form. Additional U.S. Patents disclosing thermal and/or piezo pulse jet deposition of biopolymer containing fluids onto a substrate include: U.S. Pat. Nos. 4,877,745; 5,449,754; 5,474,796; 5,658,802; 5,700,637; and 5,958,342.

Despite the advances made to date in the arena of pulse jet printing of biopolymeric arrays, there is a continued need for improvement in this field. Of particular interest would be the development of highly accurate pulse jet printing devices that are able to print a multitude of different fluids at the same time, where the devices require little maintenance and yet produce high quality, dense arrays.

Relevant Literature

U.S. Pat. Nos. 4,877,745; 5,449,754; 5,474,796; 5,658, 802; 5,700,637; and 5,958,342; 6,221,653; and 6,242,266. Additional U.S. Patents of interest that describe traditional thermal inkjet devices and methods for their use in ink deposition include: U.S. Pat. Nos. 4,500,895; 4,771,295; 5,278,584; 5,305,015; 6,155,675; 6,155,676; 6,183,067; 6,290,331; See also: The Hewlett-Packard Journal, Vol. 39, No. 4 (August 1988).

SUMMARY OF THE INVENTION

Pulse jet printhead assemblies having multiple reservoirs and multiple printhead dies, as well as methods for their use in the deposition of fluids, typically fluids containing a biopolymer or precursor thereof, onto a substrate surface, are provided. The subject printheads are characterized by having a multiple printhead die printhead and a multiple reservoir housing affixed to the multiple die printhead. In using the subject printhead assemblies, the firing chambers of the printhead assembly are loaded with a volume of fluid that includes a biopolymer or precursor thereof. The loaded printhead assembly is then placed in opposing relation to a surface of a substrate and actuated to deposit a volume of fluid on the substrate. The subject printhead assemblies find use in a variety of applications, including the production of biopolymeric arrays.

DEFINITIONS

Figure 1:
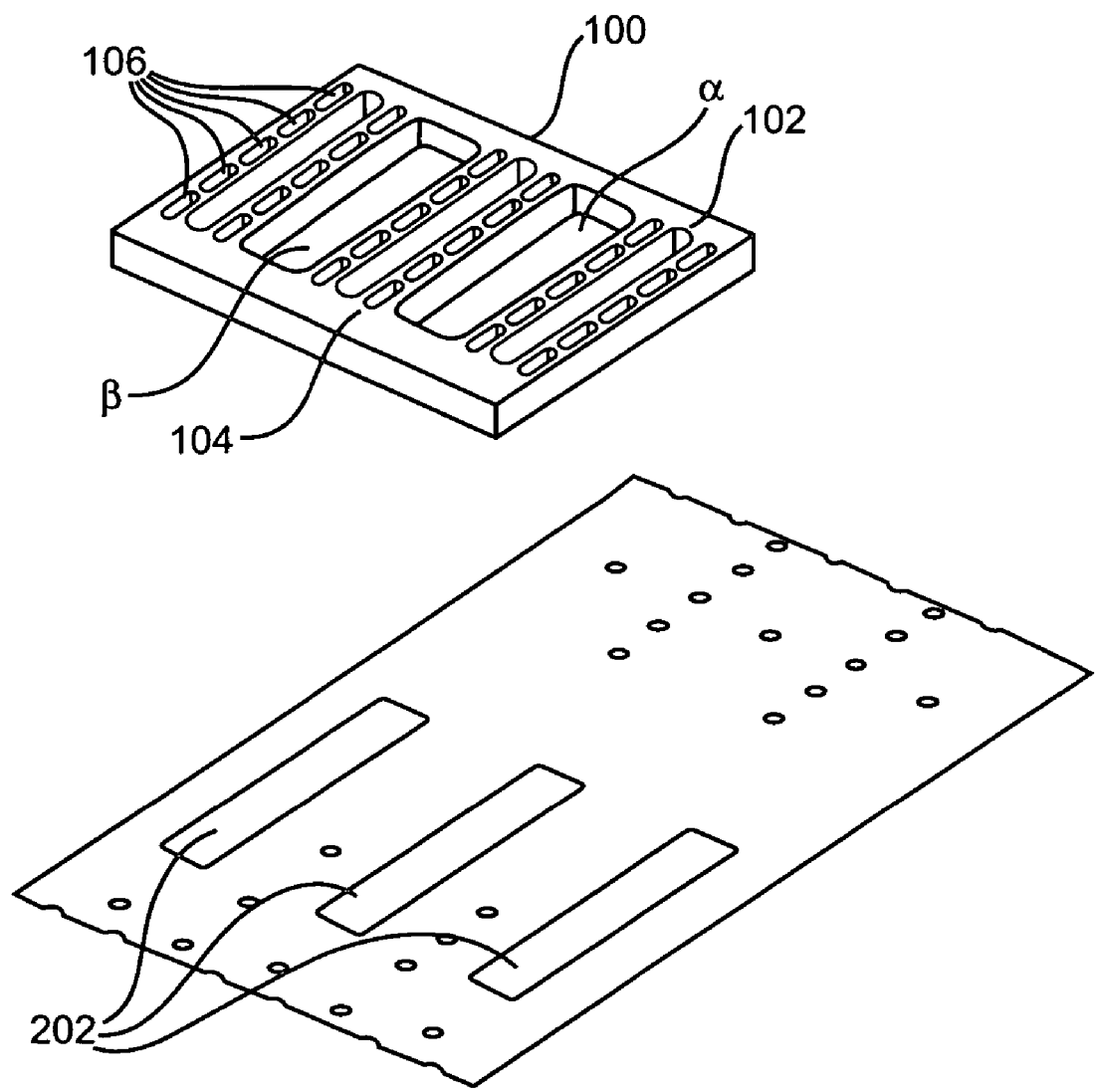
FIG. 1 provides an exploded view of a representative printhead assembly according to the subject invention.

The term "nucleic acid" as used herein means a polymer composed of nucleotides, e.g. deoxyribonucleotides or ribonucleotides.

The terms "ribonucleic acid" and "RNA" as used herein mean a polymer composed of ribonucleotides.

The terms "deoxyribonucleic acid" and "DNA" as used herein mean a polymer composed of deoxyribonucleotides.

The term "oligonucleotide" as used herein denotes single stranded nucleotide multimers of from about 10 to up to about 100 nucleotides in length.

The term "polynucleotide" as used herein refers to a single or double stranded polymer composed of nucleotide monomers of generally greater than 100 nucleotides in length and up to about 8,000 or more nucleotides in length. Polynucleotides include single or multiple stranded configurations, where one or more of the strands may or may not be completely aligned with another.

A "nucleotide" refers to a subunit of a nucleic acid and includes a phosphate group, a 5 carbon sugar and a nitrogen containing base, as well as analogs of such subunits.

The term "peptide" as used herein refers to any compound produced by amide formation between a carboxyl group of one amino acid and an amino group of another group.

The term "oligopeptide" as used herein refers to peptides with fewer than about 10 to 20 residues, i.e. amino acid monomeric units.

The term "polypeptide" as used herein refers to peptides with more than 10 to 20 residues.

The term "protein" as used herein refers to polypeptides of specific sequence of more than about 50 residues.

The term "array" as used herein means an substrate having a plurality of binding agents stably attached to its surface, where the binding agents may be spatially located across the surface of the substrate in any of a number of different patterns.

The term "binding agent" means any agent that is a member of a specific binding pair, where such agents include: peptides, e.g. proteins or fragments thereof; nucleic acids, e.g. oligonucleotides, polynucleotides; and the like; etc.

The term "biopolymer" includes peptides or polynucleotides, as well as such compounds composed of or containing amino acid or nucleotide analogs or non-nucleotide groups. As such, this term includes those compounds in which the conventional polynucleotide backbone has been replaced with a non-naturally occurring or synthetic backbone, and those a nucleic acid in which one or more of the conventional bases has been replaced with a synthetic base capable of participating in Watson-Crick type hydrogen bonding interactions.

A "biomonomer" references a single unit, which can be linked with the same or other biomonomers to form a biopolymer (for example, a single amino acid or nucleotide with two linking groups one or both of which may have removable protecting groups). A biomonomer fluid or biopolymer fluid reference a fluid containing either a biomonomer or biopolymer, respectively.

Reference to a "droplet" being dispensed from a pulse jet herein, merely refers to a discrete small quantity of fluid (usually less than about 1000 pL) being dispensed upon a single pulse of the pulse jet (corresponding to a single activation of an ejector) and does not require any particular shape of this discrete quantity.

"Fluid" is used herein to reference a liquid. Further, when reference is made in this application to providing a pressure within the dispensing head or a chamber therein this refers, unless a contrary indication appears, to a pressure therein relative to the pressure immediately outside the head pulse jet orifices. Such pressures can be provided by varying the pressure outside the head, or inside the head, or both.

The term "printhead" refers to an integrated structure that includes an orifice plate and at least one printhead dye present thereon, e.g., affixed or bonded thereto.

The term "printhead assembly" refers to a printhead affixed to a housing.

DESCRIPTION OF THE SPECIFIC EMBODIMENTS

Pulse jet printhead assemblies having multiple reservoirs and multiple printhead dies, as well as methods for their use in the deposition of fluids, typically fluids containing a biopolymer or precursor thereof, onto a substrate surface, are provided. The subject printheads are characterized by having a multiple printhead die printhead and a multiple reservoir housing affixed to the multiple die printhead. In using the subject printhead assemblies, the firing chambers of the printhead assembly are loaded with a volume of fluid that includes a biopolymer or precursor thereof. The loaded printhead assembly is then placed in opposing relation to a surface of a substrate and actuated to deposit a volume of fluid on the substrate. The subject printhead assemblies find use in a variety of applications, including the production of biopolymeric arrays.

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an" and "the" include plural reference unless the context clearly dictates otherwise. Unless defined otherwise, all technical and scientific terms used herein have the same meaning as commonly understood to one of ordinary skill in the art to which this invention belongs.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood to one of ordinary skill in the art to which this invention belongs. Although any methods, devices and materials similar or equivalent to those described herein can be used in the practice or testing of the invention, the preferred methods, devices and materials are now described.

All publications mentioned herein are incorporated herein by reference for the purpose of describing and disclosing components that are described in the publications which might be used in connection with the presently described invention.

As summarized above, the subject invention provides pulse jet printhead assemblies and methods for using the same in the deposition of biopolymer/biomonomer fluids onto a substrate, e.g., for the production of biopolymeric arrays. In further describing the subject invention, the subject printhead assemblies are described first in greater detail, followed by a review of methods for using the same as well as other aspects of the invention.

Pulse Jet Printhead Assemblies Having Multiple Printhead Dies and Multiple Reservoirs As summarized above, the subject invention provides pulse jet printhead assemblies, where the pulse jet printhead assemblies are characterized by having multiple printhead dies and multiple reservoirs. With respect to the nature of the pulse jet printhead assemblies, they may be thermal pulse jet printhead assemblies, piezolectric pulse jet printhead assemblies, or analogous pulse jet printhead assemblies. The subject printhead assemblies are made up of two distinct components: a multiple die printhead and a multiple reservoir housing, where the housing and the printhead are affixed to each other to produce the subject printhead assemblies. Each of these components is now discussed separately in greater detail.

Multiple Reservoir Housing

The multiple reservoir housing component of the subject printhead assemblies is a structure that includes multiple reservoir elements and is configured in a manner such that, upon affixation or bonding to (or otherwise juxtaposition with) a multiple die printhead, as described below, the orifice to orifice spacing of the orifices on the orifice plate are not altered. In other words, the housing is configured in a way so that when it is affixed to the printhead, the distance between any two given orifices on the orifice plate of the printhead is not altered in any substantial way, where any alteration in distance is less than about 20 microns, usually less than about 12.5 microns. As such, the reservoir housing is dimensioned to not overconstrain the dies on the printhead with which it is designed to be used, so that during curing of the adhesive in the fabrication of assemblies of the subject invention, the dies are able to "float" in the adhesive, but cannot move or move only in a very repeatable manner during curing.

The multiple reservoir housing of the subject invention includes a plurality of reservoir elements that, in conjunction with the reservoir mating surface of the multiple die printhead for which the housing is designed, make up the multiple reservoirs of the printhead assemblies of the subject invention. The ratio of reservoir elements to printhead dies with respect to the particular printhead for which the housing is designed may vary, but typically ranges from about 2 to about 20, usually from about 4 to about 12. As such, while the number of different reservoir elements in the housing may vary, in many embodiments the number of different reservoir elements in the housing ranges from about 2 to about 100, usually from about 8 to about 40.

The reservoir elements of the subject housings may have a variety of different configurations, so long as that when the housing is placed on the surface of the printhead in the final assembly, a reservoir is formed that is capable of holding a volume of fluid, where this volume of fluid typically ranges from about 1 microliter to about 15 microliters, usually from about 3 microliters to about 10 microliters. The volume or space of each of the reservoir elements of the subject housings is bounded on each side by a wall, and is open on the bottom and top. A given reservoir element may be bounded by a single, curvilinear wall that defines/bounds the element, or may be bounded by one or more distinct walls that are joined together by more defined angles. As such, the cross-sectional configuration of the reservoir elements may be square, rectangular, circular, oval, elongated oval, etc., where in many embodiments the cross-sectional configuration is oval or elongated oval, e.g., capsule shaped, as shown in the figures of the representative housing, discussed in greater detail below.

The reservoir elements are typically arranged in the housing with respect to the arrangement of the multiple dies of the printhead with which the housing is to be employed. While in theory any configuration of reservoir elements is possible, in many embodiments the reservoir elements are arranged in parallel sets of two columns that flank either side of the printhead dies when the housing is mounted on the printhead die. The number of different parallel sets of two columns in a given housing element may vary, but typically ranges from about 2 to about 10, usually from about 2 to about 4. The number of individual reservoir elements in each column may also vary, but typically ranges from about 1 to about 10, usually from about 2 to about 6.

The walls defining the reservoir elements are selected to be sufficiently high to prevent fluid movement, e.g., by wicking, over the top of the reservoir walls. In other words, the walls of the reservoir elements of the subject housings are of sufficient height such that the fluid inside the reservoir cannot move up and over the walls and into other areas, e.g., reservoirs, of the housing. Generally, the height of the reservoir walls ranges from about 2 to about 15, usually from about 3 to about 10 mm.

In many embodiments, the reservoir housings of the subject invention include excess adhesive flow paths, which flow paths allow for greater tolerance in specification and ease of manufacturing protocol. During manufacture, as described in greater detail below, the flow paths provide a place for excess adhesive applied to the printhead and/or housing to reside following the mounting step and during curing, so as to ensure that the orifice to orifice spacing of the printhead is not adversely changed or altered by the fabrication process. The housing may include a number of different flow paths which may take any convenient configuration, where the flow paths are typically channels or other analogous fluid flow structures, e.g., canals, trenches, etc.

In addition, many embodiments of the subject housings include one or more elements that ensure location stability of the adhesive during fabrication, e.g., location stability of epoxy during curing, so that gaps or other imperfections in the seals produced by the adhesive at the housing/printhead interface are avoided. In many embodiments, this element takes the form of one or more discontinuities present on the printhead mating surface of the housing, e.g., one or more slightly raised bumps or other protruding structures on the printhead mating surface, where the height of these discontinuities typically ranges from about 10 to about 300 microns, usually from about 50 to about 150 microns.

The subject housings may be fabricated from a variety of different materials, including metals, plastics, and composites thereof. In many embodiments, the housings are fabricated from polymeric materials, where specific materials of interest include, but are not limited to: polycarbonate or acrylic, ceramic, and the like. The housings may be fabricated using any convenient protocol, where representative protocols include, but are not limited to: machining, molding, ceramic firing, chemical binding, etc. Importantly, the reservoir housing is manufactured according to tight tolerances with respect to the printhead for which it is intended and the adhesive with which it is to be employed, such that during fabrication of an assembly using the subject housings, substantially no, if any, variation in orifice to orifice spacing occurs in the orifice plate of the printhead.

A representative multiple reservoir housing according to the subject invention is depicted in FIGS. 1 to 4. In FIG. 1, representative multiple reservoir housing 100 is designed to be used with a three die printhead and includes three sets 102 of reservoir columns 104, each set made up of two reservoir columns. The number of reservoir elements 6 in each reservoir column is 5, but of course this number may vary, typically being at least about 2, usually at least about 4 and sometimes as great as 10, 15, 20 or more. The inter-set spacing α of the housing may vary, ranging from about 10 to about 100 mm, usually from about 25 to about 50 mm, but is constant within a given housing so as to provide for maintenance of the orifice to orifice spacing upon fabrication of the printhead assembly. Likewise, the inter-column spacing β of the housing may vary, ranging from about 2 to about 10 mm, usually from about 3 to about 6 mm, but is constant within a given housing so as to provide for maintenance of the orifice to orifice spacing upon fabrication of the printhead assembly. The inter-set spacing is typically longer than the inter-column spacing, such that the ratio of α/β typically ranges from about 5 to about 10, usually from about 6 to about 8.

Figure 2A:
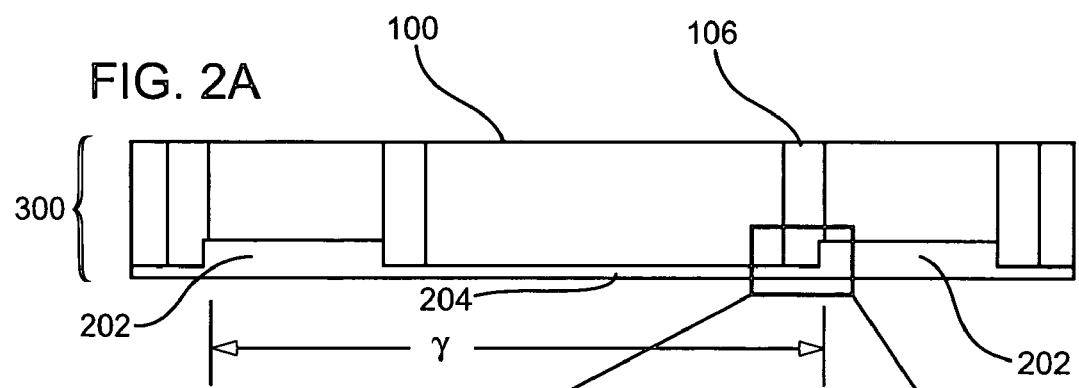
FIG. 2, made up of FIGS. 2A and 2B, provides a side cutaway view of a representative printhead assembly according to the subject invention.
Figure 2B:
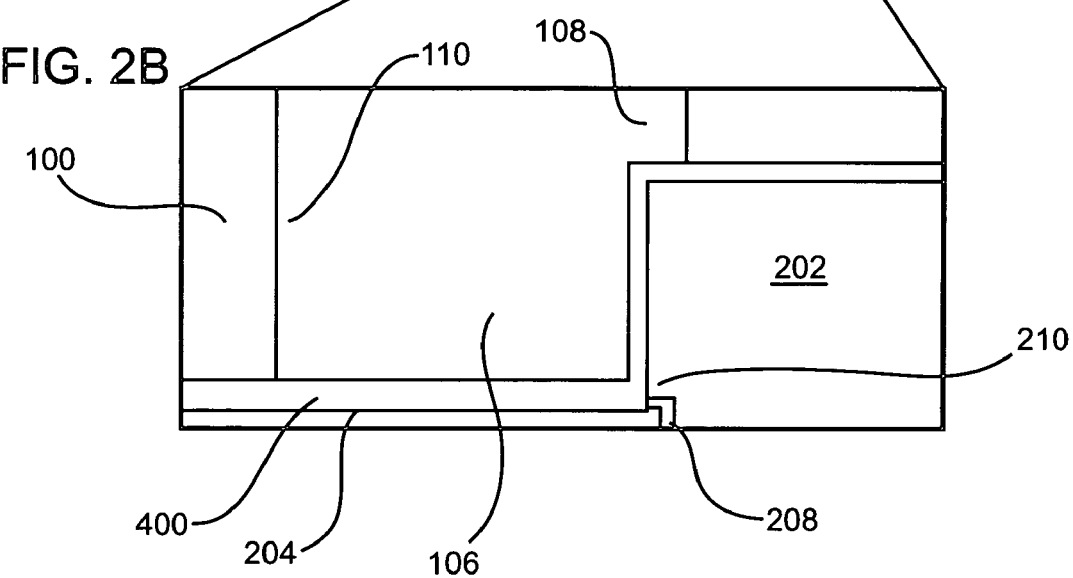

FIGS. 2A and 2B provide a side cutaway view of a portion of representative housing 100 when present in a printhead assembly 300 of the subject invention. In FIGS. 2A and 2B, opposing walls of the reservoir element 106 are clearly visible, i.e., 108 and 110. As can be seen, wall 108 is shorter than wall 110, so that wall 108 can fit over the die of the printhead. The height of wall 108 typically ranges from about 1 to about 15 mm, usually from about 3 to about 10 mm; while the height of wall 110 typically ranges from about 1.5 to about 18 mm, usually from about 3.5 to about 12 mm. The orifice to orifice spacing γ typically ranges from about 10 to about 100 mm, usually from about 25 to about 50 mm.

Figure 3:
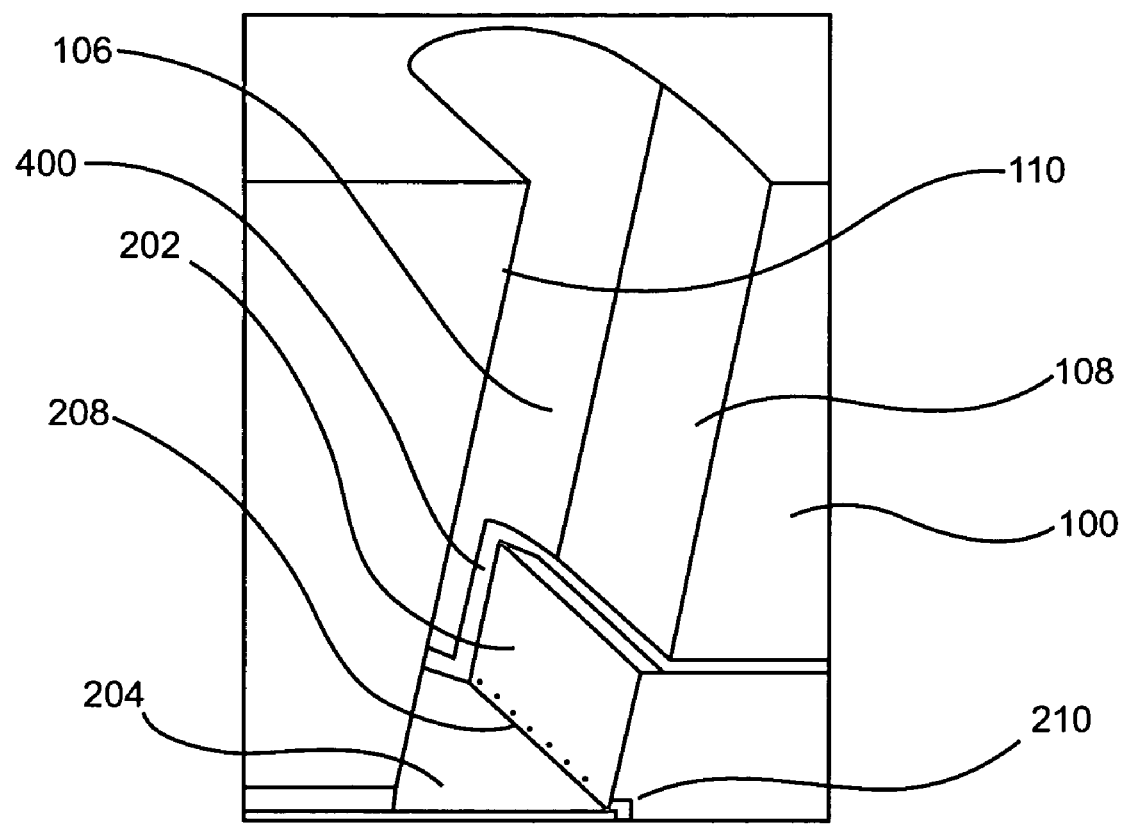
FIG. 3 provides a side cutaway view of a reservoir in an assembled representative printhead according to the subject invention.
Figure 4:
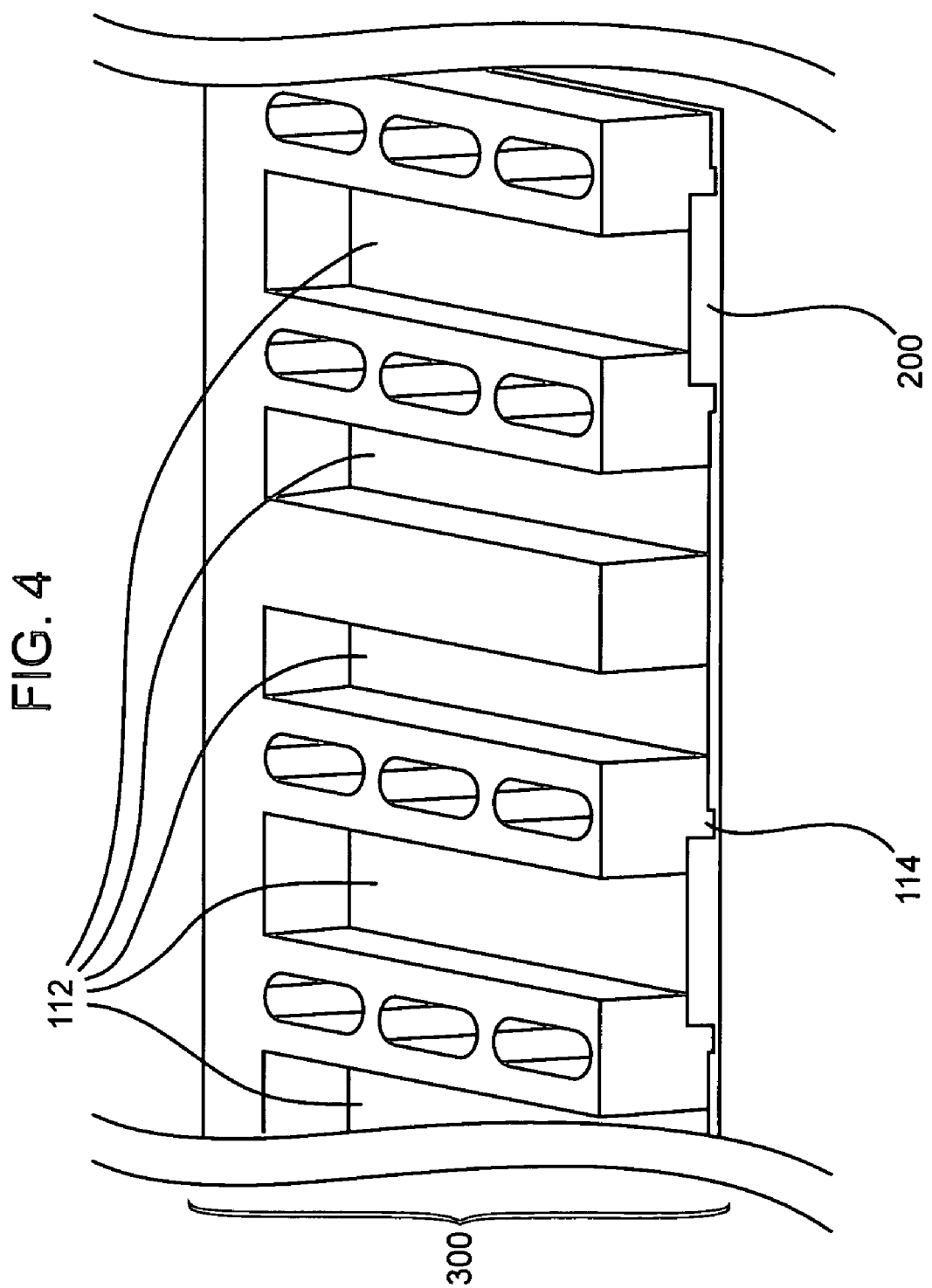
FIG. 4 provides an overhead view of a representative printhead assembly according to the subject invention.

FIG. 3 provides another cutaway view of an individual reservoir element of housing 100, and FIG. 4 provides an overhead view of the reservoir elements 106 of housing 100, where one can see the elongated oval or capsule cross-sectional configuration of each reservoir element. Also seen in FIG. 4 are the excess adhesive flow channels 112 and the discontinuities 114.

Multiple Die Printheads

The second component of the subject printhead assemblies is the multiple die printhead, which component is affixed or bonded to the housing to produce the subject printhead assemblies. The printheads of the subject invention are made up of multiple dies that are present on a surface of, e.g., bonded to, an orifice plate with multiple orifices such that the printhead has at least one firing chamber, and typically a plurality of firing chambers. Each of the printheads includes multiple dies present on an orifice plate, where each die includes a set of plural electrically activated pulse generating members (thermal or piezo) and a corresponding set of electrical conductors extending along the common plate to a connector pad, the members of each conductor set being "independent" from members of the other sets (i.e. they are not mixed in with one another). The pads are electrically connected to a processor to control the pulse generating members.

The dies may be piezolelectric or thermal pulse jet dies, (or another analogous pulse jet die) as is known in the art. For convenience, the device is now further described in more detail in terms of the thermal pulse jet die embodiments.

As is known to those of skill in the art, thermal pulse jet heads typically have at least the following components: (a) an orifice; (b) a firing chamber; and (c) a heating element. Thermal pulse jet heads and methods for their manufacture and use are described in a number of different U.S. Patents, including: U.S. Pat. Nos. 5,772,829; 5,745,128; 5,736,998; 5,736,995; 5,726,690; 5,714,989; 5,682,188; 5,677,577; 5,642,142; 5,636,441; 5,635,968; 5,635,966; 5,595,785; 5,477,255; 5,434,606; 5,426,458; 5,350,616; 5,341,160; 5,300,958; 5,229,785; 5,187,500; 5,167,776; 5,159,353; 5,122,812; and 4,791,435; the disclosures of which are herein incorporated by reference.

The thermal pulse jet heads of the subject invention are characterized by having multiple printhead dies present on, e.g., bonded to, an orifice plate having multiple orifices to produce a structure having at least one functional firing chamber and typically a plurality of different firing chambers. (Alternatively, depending on the manufacturing protocol employed, an integral structure of printhead dies present on a surface of an orifice plate may make up the printhead). By multiple printhead dies is meant that each printhead includes from 2 to about 10 or more printhead dies, where typically the number of printhead dies on a printhead of the subject invention ranges from 2 to about 7 and more usually from 2 to about 5, where in certain embodiments, the number of different printhead dies on a given printhead of the subject invention is 2, 3 or 4. By multiple orifices is meant at least about 5 orifices, usually at least about 10 orifices, where the number of orifices of the printhead may range from about 10 to about 1000, usually from about 60 to about 600. The orifices of the printhead may be arranged on the exposed surface of the orifice plate, described in greater detail below, in any convenient pattern so long as the orifices line up with the printhead dies to produce functional firing chambers, where in many embodiments the orifices are arranged in parallel columns, where the orifice to orifice distance between any two adjacent orifices in a give column ranges from about 50 microns to about 500 microns, usually from about 60 microns to about 200 microns and the distance between any two adjacent separate columns of orifices ranges from about 2 mm to about 10 mm, usually from about 3 mm to about 6 mm. The number of distinct firing chambers in the subject printheads may vary and is at least one, where in many embodiments the number ranges from about 2 to about 100 and more usually from about 4 to about 40. The size of each of the orifices is sufficient to produce a spot of suitable dimensions on the substrate surface (described in greater detail below), where the orifices generally have a diameter (or exit diagonal depending on the specific format of the ink jet head) ranging from about 1 to 1000 μm, usually from about 5 to 100 μm and more usually from about 10 to 60 μm. The firing chambers have volumes ranging from about 1 pl to 10 nl, usually from about 10 pl to 5 nl and more usually from about 35 pl to 1.5 nl. The overall dimensions of the subject printheads may vary, but typically the printheads have a width that ranges from about 15 to about 100 mm, usually from about 25 to about 60 mm; a length that ranges from about 30 to about 100 mm, usually from about 25 to about 60 mm and a height that ranges from about 20 to about 200 mm, usually from about to 30 about 100 mm.

In many embodiments, the subject printheads are made up of two main components fixedly secured together, i.e., multiple printhead dies and an orifice plate, with certain sub-components positioned therebetween. These components and additional information concerning the printheads in general are outlined in U.S. Pat. No. 5,278,584, the disclosure of which is herein incorporated by reference. The first main component of the printhead is the printhead die, where the subject printheads include multiple printhead dies. Each printhead die consists of a substrate preferably manufactured from silicon [Si] or other conventional semi-conductor material, such as the semi-conductor materials known in the art for this purpose. Secured to and positioned on a surface, e.g., the upper surface of the substrate, e.g., using standard thin film fabrication techniques, is at least one and typically a plurality of individually energizable thin-film resistors which, upon actuation, provide the motive force used to expel fluid from the printhead, where in many embodiments the resistors are made from a tantalum-aluminum [TaAl] composition known in the art for resistor fabrication. The number of resistors present on the surface of the substrate of a given printhead may vary, where the number in many embodiments ranging from about 24 to about 10000, and often from about 120 to about 2500. It should be noted that any statements provided herein involving the use of a substrate having at least one resistor thereon shall encompass a situation in which (1) the resistor is secured directly on and to the surface of the substrate without any intervening material layers therebetween; or (2) the resistor is supported by the substrate (e.g. positioned thereon) in which one or more intermediate material layers are located between the substrate and resistor, with both of these alternatives being considered equivalent and encompassed within the present claims. For example, an electrically insulating base layer made of silicon dioxide [$SiO_2$] may be employed on the substrate, with the resistor elements being placed on the base layer. Accordingly, placement of the selected resistors on a given substrate shall again be deemed to encompass both of the alternatives outlined above. Also present on the resistor displaying surface of the substrate is typically a plurality of metallic conductive traces which electrically communicate with the resistors. The conductive traces also typically communicate with multiple metallic pad-like contact regions positioned at the ends of the substrate on the resistor displaying surface. The function of all these components that, in combination, are collectively designated herein as a resistor assembly, is to provide an actuation means for the individual resistors of the printhead die. Many different materials and design configurations may be used to construct the resistor assembly, with the present invention not being restricted to any particular elements, materials, and components for this purpose. It should also be noted that the substrate may include a number of other components thereon. For example, the substrate may include a plurality of logic transistors for precisely controlling operation of the resistors, as well as a "demultiplexer" of conventional configuration as outlined in U.S. Pat. No. 5,278,584, the disclosure of which is herein incorporated by reference. The demultiplexer is used to demultiplex incoming multiplexed signals and thereafter distribute these signals to the various thin film resistors on the substrate surface of the printhead die. The use of a demultiplexer for this purpose enables a reduction in the complexity and quantity of the circuitry (e.g. contract regions and traces) formed on the substrate. The overall dimensions of the printhead dies as described above vary, but in many embodiments, the width of each of the printhead dies on the printhead ranges from about 2 to about 10 mm, usually from about 3 to about 6 mm; the length of each of the printhead dies ranges from about 6 to about 50 mm, usually from about 10 to about 30 mm and the height of each of the printhead dies ranges from about 0.4 to about 1.5 mm, usually from about 0.6 to about 1 mm.

The second main component of the printheads of the subject invention is the orifice plate. The orifice place may be a rigid plate structure manufactured from an inert metal composition (e.g. gold-plated nickel) or a non-metallic, organic polymer film, as is known in the art. In many embodiments, the orifice plate is an organic polymer film. This type of orifice plate generally includes a flexible film-type elongate member manufactured from a selected organic polymer film product which may or may not (preferred) include metal atoms within or attached to the basic polymeric structure. The phrase "organic polymer" shall be defined in a conventional manner. Organic polymers basically involve carbon-containing structures of repeating organic chemical subunits. A number of different polymeric compositions may be employed for this purpose, with the present invention not being restricted to any particular construction materials. For example, the orifice plate may be manufactured from the following compositions: polytetrafluoroethylene (e.g. Teflon®), polyimide, polymethylmethacrylate, polycarbonate, polyester, polyamide, polyethylene-terephthalate, or mixtures thereof. Likewise, a representative commercial organic polymer (e.g. polyimide-based) composition which is suitable for constructing the orifice plate is a product sold under the trademark KAPTON® by E.I. du Pont de Nemours & Company of Wilmington, Del. (USA). Orifice plate structures produced from the non-metallic compositions described above are typically uniform in thickness and highly flexible. Likewise, they provide numerous benefits ranging from reduced production costs to a substantial simplification of the overall printhead architecture which translates into improved reliability, economy, and ease of manufacture. Typically, the flexible orifice plate is designed to "wrap around" an outwardly extending printhead support structure in a completed printhead assembly/cartridge. The film-type elongate member which is used to form the orifice plate further includes a top surface and a bottom surface. Formed on the bottom surface of the orifice plate and shown in dashed lines in is a plurality of metallic (e.g. copper) circuit traces which are applied to the bottom surface using known metal deposition and photolithographic techniques. Many different circuit trace patterns may be employed on the bottom surface of the elongate member of the orifice plate, with the specific pattern depending on the particular type of fluid deposition cartridge and printing system under consideration. Also provided on the top surface of the orifice plate is a plurality of metallic (e.g. gold-plated copper) contact pads. The contact pads communicate with the underlying circuit traces on the bottom surface of the plate via openings or "vias" through the elongate member of the orifice plate. During use, the pads come in contact with corresponding printer electrodes in order to transmit electrical control signals from the printer unit to the contact pads and circuit traces on the orifice plate for ultimate delivery to the resistor assembly. Electrical communication between the resistor assembly and the orifice plate will be discussed below.

Positioned within the middle region of the elongate member of the orifice plate is a plurality of openings or orifices which pass entirely through the plate. In the completed printhead all of the components listed above are assembled (discussed below) so that each of the orifices is aligned with at least one of the resistors on the substrate surface of a printhead die. As a result, energization of a given resistor causes fluid expulsion from the desired orifice through the orifice plate. Any convenient orifice pattern may be present on the orifice plate, so long as bonding of the printhead dies to the orifice plate results in formation of a functional printhead assembly with one or more firing chambers. For example, the orifices may be arranged in parallel rows on the elongate member. Where this arrangement is employed, the resistors on the resistor assembly of the printhead dies will also be arranged in corresponding rows so that the rows of resistors are in substantial registry (e.g. alignment) with the rows of orifices.

In many embodiments, also provided are beam-type leads that, in a representative embodiment, are gold-plated copper and constitute the terminal ends e.g. the ends opposite the contact pads of the circuit traces, positioned on the bottom surface of the elongate member of the orifice plate. The leads are designed for electrical connection by soldering, thermocompression bonding, and the like to the contact regions on the upper surface of the substrate associated with the resistor assembly.

The subject printheads, as described above, may be fabricated according to the following protocol. With respect to the orifice plate component of the subject printheads, all of the openings therethrough, e.g., the orifices, are typically formed using conventional laser ablation techniques as again discussed in U.S. Pat. No. 5,278,584; the disclosure of which is herein incorporated by reference. Specifically, a mask structure initially produced using standard lithographic techniques is employed for this purpose. A laser system of conventional design is then selected which, in a preferred embodiment, involves an excimer laser of a type selected from the following non-limiting alternatives: $F_2$, ArF, KrCl, KrF, or XeCl. Using this particular system (along with preferred pulse energies of greater than about 100 millijoules/cm$^2$ and pulse durations shorter than about 1 microsecond), the openings (e.g. orifices) can be formed with a high degree of accuracy, precision, and control. Other methods are also suitable for producing the completed orifice plate including conventional ultraviolet ablation processes (e.g. using ultraviolet light in the range of about 150–400 nm), as well as standard chemical etching, stamping, reactive ion etching, ion beam milling, mechanical drilling, and similar known processes.

After the orifice plate is produced as discussed above, the printhead is completed by attaching the multiple printhead dies/resistor assemblies (e.g. the substrate having the resistors thereon) to the orifice plate. In a preferred embodiment, fabrication of the subject printheads is accomplished using tape automated bonding ("TAB") technology. The use of this particular process to produce the subject printheads is again discussed in considerable detail in U.S. Pat. No. 5,278,584; the disclosure of which is herein incorporated by reference. Likewise, background information concerning TAB technology is also generally provided in U.S. Pat. No. 4,944,850; the disclosure of which is herein incorporated by reference. In a TAB-type fabrication system, the processed elongate member of the orifice plate which has already been ablated and patterned with the circuit traces and contact pads exists in the form of multiple, interconnected "frames" on an elongate "tape", with each "frame" representing one supbart of the total orifice plate to which the multiple dies are to be attached. The tape is thereafter positioned (after cleaning in a conventional manner to remove impurities and other residual materials) in a TAB bonding apparatus having an optical alignment sub-system. Such an apparatus is well-known in the art and commercially available from many different sources including but not limited to the Shinkawa Corporation of Japan (model no. IL-20 or other comparable model). Within the TAB bonding apparatus, the printhead dies associated with the resistor assembly and the orifice plate are properly oriented so that (1) the orifices of a given frame or subpart of the total orifice plate are in precise alignment with the resistors on the printhead die to be affixed to the plate; and (2) the beam-type leads associated with the circuit traces on the orifice plate are in alignment with and positioned against the contact regions on the substrate printhead die. The TAB bonding apparatus then uses a "gang-bonding" method (or other similar procedures) to press the leads onto the contact regions. The TAB bonding apparatus thereafter applies heat in accordance with conventional bonding processes in order to secure these components together. It is also important to note that other standard bonding techniques may likewise be used for this purpose including but not limited to ultrasonic bonding, conductive epoxy bonding, solid paste application processes, and similar methods. In this regard, the claimed invention shall not be restricted to any particular processing techniques associated with the printhead.

Additional layers of material are typically present between the orifice plate and resistor assembly/printhead die. These additional layers perform various functions including electrical insulation, adhesion of the orifice plate to the resistor assembly/printhead die, and the like. For example, an intermediate fluid barrier layer which covers the conductive traces, but is positioned between and around the resistors without covering them may be present, where suitable barrier layers include conventional organic polymers, photoresist materials, or similar compositions as outlined in U.S. Pat. No. 5,278,584, the disclosure of which is herein incorporated by reference. Also present on the barrier layer may be an adhesive layer, where representative adhesive materials suitable for this layer include commercially available epoxy resin and cyanoacrylate adhesives known in the art for this purpose, uncured poly-isoprene photoresist compounds; polyacrylic acid; and/or a selected silane coupling agent, where the adhesive layer is specifically used to attach/secure the orifice plate to and within the printhead so that the orifice plate is fixedly maintained in position over and above the printhead dies having the resistors thereon.

It should likewise be understood that there are typically a number of additional material layers positioned between the barrier layer and the underlying printhead dies. For information on these structures, U.S. Pat. Nos. 4,535,343; 4,616,408; 5,122,812 may be consulted which are incorporated herein by reference. In summary, these materials normally include the following layers (not shown): (1) a dielectric "base layer" (conventionally made from silicon dioxide [$SiO_2$]) located directly on the printhead die substrate surface which is designed to electrically insulate the substrate from the resistors; (2) layer of a "resistive material" on the base layer which is used to create or "form" the resistor elements (typically made from a mixture of elemental aluminum [Al] and elemental tantalum [Ta] also known as "TaAl" that is known in the art for thin-film resistor fabrication), with other exemplary resistive materials including phosphorous-doped polycrystalline silicon [Si], tantalum nitride [$Ta_2N$], nichrome [NiCr], hafnium bromide [$HfBr_4$], elemental niobium [Nb], elemental vanadium [V], elemental hafnium [Hf], elemental titanium [Ti], elemental zirconium [Zr], elemental yttrium [Y], and mixtures thereof; (3) a "conductive layer" of material (e.g. elemental aluminum [Al], elemental gold [Au], elemental copper [Cu], and/or elemental silicon [Si]) which is positioned on the resistive layer in discrete portions having gaps therebetween, with the "exposed" sections of the resistive layer between the gaps forming the resistor elements; (4) a "first passivation layer" made from, for example, silicon dioxide [$SiO_2$], silicon nitride [SiN], aluminum oxide [$Al_2O_3$], or silicon carbide [SiC] which is positioned over the conductive layer/resistor elements for protective purposes; (5) an optional protective "second passivation layer" made from, for example, silicon carbide [SiC], silicon nitride [SiN], silicon dioxide [$SiO_2$], or aluminum oxide [Al$_2$O$_3$] positioned on the first passivation layer; (6) an electrically conductive and protective "cavitation layer" made from, for example, elemental tantalum [Ta], elemental molybdenum [Mo], elemental tungsten [W], or mixtures/alloys thereof that is placed on the second passivation layer or first passivation layer depending on whether the second passivation layer is employed; and (7) an optional internal adhesive layer placed on the cavitation layer which may involve a number of different compositions without limitation including conventional epoxy resin materials, standard cyanoacrylate adhesives, silane coupling agents, and the like. This layer (if needed as determined by routine preliminary testing) is used to secure the barrier layer in position on the underlying printhead components.

Referring back to the TAB bonding process as previously discussed, following positioning of the multiple printhead dies onto the tape having the multiple subpart or multiple frame orifice plate configuration, the resultant pre-printhead is ultimately subjected to heat and pressure within a heating/pressure-exerting station in the TAB bonding apparatus. This step (which may likewise be accomplished using other heating methods including external heating of the printhead) causes thermal adhesion of the internal components together. As a result, the printhead assembly process is completed at this stage and, upon separation from the tape component, produces a printhead, such as the representative multiple die printhead 300 as shown in FIG. 1. The resultant multiple printhead die printheads, a representative embodiment thereof 300 shown in FIG. 1, are then ready for use in a printhead assembly of the subject invention.

Printhead Assemblies

Also provided by the subject invention are printhead assemblies that include the above described multiple printhead die printheads and multiple reservoir housings, as described above. In many embodiments, each reservoir of the multiple reservoir housing is in fluid communication with at least one firing chamber and orifice associated therewith. However, each firing chamber/orifice of the printhead component of the assembly is in fluid communication with only one reservoir. The reservoir and firing chamber may be directly connected or indirectly connected through a conduit of substantially uniform cross-section. The printhead may be affixed or bonded to the housing, i.e., the housing may be mounted on the printhead, in any convenient manner so long as the positional accuracy between the laser ablated holes of the orifice plate is maintained. The ratio of reservoirs to firing chambers/orifices in the subject printhead assemblies may vary, but typically ranges from about 3 to about 60, usually from about 10 to about 30.

The subject printhead assemblies are typically fabricated using an adhesive composition to secure the two components together and provide a seal, e.g., fluid barrier, between the various reservoirs of the assembled printhead assembly. Any convenient adhesive composition may be employed, including those compositions discussed above in connection with the fabrication of the printhead component. In producing the subject printhead assemblies, a sufficient amount of adhesive composition is applied to one or more areas (and typically to all mating surfaces) of the housing and/or printhead. Following application, the housing and printhead mating surfaces are joined and maintained for a sufficient period of time for the adhesive to mature. Importantly, because of the precise specifications employed during the housing fabrication, the printhead assembly process need not be performed using expensive equipment and/or complicated procedures, providing a significant advantage to array production protocols that employ the subject printhead assemblies, as described in greater detail below.

The above fabrication process produces a multiple reservoir/multiple die printhead assembly, which assembly includes multiple reservoirs and, typically, multiple firing chambers, as discussed above.

FIGS. 1 to 4 provide various views of a representative printhead assembly according to the subject invention. FIG. 1 provides an exploded view of a representative printhead assembly 300 that includes a housing 100 and printhead 200, where the printhead 200 has three different dies 202 and the housing 100 has three corresponding sets 102 of reservoir element columns 104, each column having 5 different reservoir elements 106. FIGS. 2A and 2B provide a side view of the representative printhead assembly 300. In FIG. 2A, printhead assembly 300 includes housing 100 mounted on printhead 200, which includes dies 202 on orifice plate 204. Reservoirs 106 which are bounded by the reservoir elements walls and the printhead surface are visible as well. Also shown is the orifice to orifice spacing γ, which spacing typically ranges from about 25 to about 50 mm. FIG. 2B provides a blow up view of a region of FIG. 2A, and shows housing 100 affixed to printhead 200 by epoxy layer 400. Reservoir 106 is bounded by walls 108/110 and die 202. Also visible is firing chamber 210 that is in fluid communication with reservoir 106 and orifice 208. FIG. 3 provides another cutaway view of a reservoir 106 in printhead assembly 300. Visible in FIG. 3 are the walls of reservoir 106 that rise a sufficient height so as to prevent fluid movement up over the walls, e.g., by wicking. FIG. 4 provides yet another view of the representative printhead assembly of FIG. 4, where the excess adhesive channels 112 and discontinuities 114 are visible.

The printhead assemblies described above find use in fluid deposition applications, and are particularly suited for use in the construction of high quality biopolymer ligand microarrays, as described in greater detail in the next section.

Methods of Using the Subject Multiple Reservoir/Multiple Die Printhead Assemblies In practicing the subject methods, a thermal pulsejet device that includes the subject multiple die printhead assemblies, as described above, is loaded with a volume of the fluid to be deposited on the substrate surface. Typically, the subject printhead assemblies are loaded with one or more distinct fluids, typically a plurality of different fluids, one in each reservoir, that include a bipolymer or a precursor thereof. In other words, the fluids of interest are ones that includes a biopolymer or a biomonomer. Biopolymers are generally biomolecules (e.g., naturally occurring molecules found in living organisms or synthetic mimetics/analogues thereof), where biomolecules of interest include polypeptides, polysaccharides, nucleic acids and the like, as well as derivatives thereof, where of particular interest in many embodiments are nucleic acids, including oligonucleotides and polynucleotides, e.g cDNA, or polypeptides, e.g., proteins or fragments thereof. Biopolymer precursors include activated monomers, e.g., activated amino acids and nucleotides, employed in step wise fabrication protocols in which biopolymeric ligands are grown on a surface of a substrate, as is known in the art. The fluid may or may not be aqueous, depending on the nature of the molecule to be delivered in the fluid. For example, biopolymeric molecules are typically delivered in an aqueous fluid, while activated monomers may require delivery in a non-aqueous fluid. The amount of fluid present in the at least one firing chamber may vary, but in many embodiments is at least about 10%, usually at least about 20% of the total volume of the firing chamber. By loaded is meant that the fluid is at least introduced into a firing chamber of the device. The fluid may be loaded into the firing chamber and fluid reservoir (if present) using any convenient means. Thus, conventional methods of introducing ink into thermal inkjet heads may be employed. Where such methods are employed, following loading of the fluid sample into the pulse jet head, it is often desirable to "prime" the device prior to use. One means of priming the device is to apply sufficient pressure to the fluid in the reservoir (or conversely negative pressure to the orifice) such that a volume of fluid is forced out of the orifice. Such priming methods are currently employed in the printing industry and thus are well known to those of skill in the art.

Alternatively, where minimal waste of the fluid sample desired, e.g. where the fluid is an expensive or rare cDNA sample, the following "front loading" method of loading the fluid sample into the firing chamber and reservoir may be employed. In this method of fluid sample loading, the orifice is contacted with the fluid under conditions sufficient for fluid to flow through the orifice and into the firing chamber of the head, where fluid flow is due, at least in part, to capillary forces. To assist in the flow of fluid into the orifice, back pressure in the form of suction (i.e. negative pressure) may be applied to the firing chamber (and reservoir, if present) of the head, where the back pressure will typically be at least about 5, and may be at least about 10 and even as great as about 100 inches of $H_2O$ or more. In general, each firing chamber (and reservoir with which it is in fluid communication, if present) is subjected to the same back pressure. This protocol is further described in U.S. patent application Ser. No. 09/302,922; the dislcosure of which is herein incorporated by reference.

The amount of fluid required to load the head is typically small, generally not exceeding more than about 10 μl, usually not exceeding more than about 5 μl and in many embodiments not exceeding more than about 2 μl. As such, the amount of fluid that is wasted in readying or preparing the thermal inkjet head for firing is minimal. As such, fluid loading is highly efficient. Therefore, the subject methods are particularly suited for use with rare and/or expensive fluid samples.

Following front loading of the printer head, the head is employed to deposit a quantity of at least one fluid sample, and generally a plurality of distinct fluid samples—one from each distinct firing chamber, onto the surface of a substrate. As the subject methods are capable of depositing an extremely small volume of fluid onto a substrate surface, the subject methods can be used to deposit a pico liter quantity of fluid onto a substrate, e.g., an array, surface. By "pico liter quantity" is meant a volume of fluid that is at least about 0.1 pl, usually at least about 1 pl and more usually at least about 10 pl, where the volume may be as high as 250 pl or higher, but generally does not exceed about 100 nL and usually does not exceed about 1 μl.

As indicated above, a feature of the subject methods is that the deposition process does not result in a substantial modulation of the activity or functionality of the biopolymers/biomonomers of interest in the fluid that is deposited, despite the small volumes front loaded into the head and the thermal inkjet deposition protocol employed. In other words, the overall activity/functionality of interest in the fluid that is deposited from the inkjet during the subject methods is not substantially different from the overall activity in the fluid loaded into the inkjet prior to deposition.

In the broadest sense, the subject methods may be used to deposit a volume of fluid sample onto any structure, specifically a surface, of any substrate, where the substrate may be a planar structure, e.g., a slide, a reagent container, e.g., a well in a multi-well plate (such as the bottom of a well), a channel or micro structure, an array etc.

To deposit fluid onto the substrate surface according to the subject methods, the loaded thermal pulse jet head is positioned in opposing relationship relative to the surface of the substrate (e.g. with an XYZ translational means), where the orifice is in opposition to the position on the array surface at which deposition of the protein solution is desired (e.g. opposite a binding agent spot on the array). The distance between the orifice and the substrate surface will not be so great that the volume of protein fluid cannot reach the substrate surface and produce a spot in a reproducible manner. As such, the distance between the orifice and the substrate surface will generally range from about 10 μm to 10 mm, usually from about 100 μm to 2 mm and more usually from about 200 μm to 1 mm.

After the head is placed into position relative to the substrate surface, the temperature of the heating elements or resistors of the head is raised to a temperature sufficient to vaporize a portion of the fluid immediately adjacent to the resistor and produce a bubble. In raising the temperature of the heating element, the temperature of the heating element is raised to at least about 100° C., usually at least about 400° C. and more usually at least about 700° C., where the temperature may be raised as high as 1000° C. or higher, but will usually be raised to a temperature that does not exceed about 2000° C. and more usually does not exceed about 1500° C. As such, a sufficient amount of energy will be delivered to the resistor to produce the requisite temperature rise, where the amount of energy will generally range from about 1.0 to 100 μJ, usually from about 1.5 to 15 μJ. The portion of fluid in the firing chamber that is vaporized will be sufficient to produce a bubble in the firing chamber of sufficient volume to force an amount of liquid out of the orifice.

The formation of the bubble in the firing chamber traps a portion or volume of the fluid present in the firing chamber between the heating element and the orifice and forces an amount or volume of fluid out of the orifice at high speed. The amount or volume of fluid that is forced out of the firing chamber can be controlled depending on the specific amount of fluid that is desired to be deposited on the substrate. As is known in the art, the amount of fluid that is expelled can be controlled by changing one or more of a number of different parameters of the pulse jet head, including: the orifice diameter, the orifice length (depth), the size of the firing chamber, the size of the heating element, and the like. Such variations are well known to those of skill in the art. As such, the amount or volume of fluid that is forced out or expelled from the firing chamber may range from about 0.1 to 2000 pl, usually from about 0.5 to 500 pl and more usually from about 1.0 to 250 pl. The speed at which the fluid is expelled from the firing chamber is at least about 1 m/s, usually at least about 10 m/s and may be as great as about 20 m/s or greater.

Upon actuation of the thermal pulse jet head of the subject invention, as described above, fluid is expelled from the orifice and travels to the substrate surface. Upon contact with the substrate surface, the deposited fluid typically forms a spot on the substrate surface. As mentioned above, by varying the design parameters of the thermal inkjet head, the spot dimensions can be controlled such that spots of various sizes can be produced. With the subject methods, one can produce spot sizes which have diameters ranging from a minimum of about 10 μm to a maximum of about 1.0 cm. In those embodiments where very small spot sizes are desired, one can produce small spots that have a diameter ranging from about 1.0 μm to 1.0 mm, usually from about 5.0 μm to 500 μm and more usually from about 10 μm to 200 μm. In many embodiments, the spot sizes range from about 30 to 100 μm in diameter.

In certain embodiments, it may be desirable to prevent evaporation of the fluid sample following deposition. Evaporation may be prevented in a number of different ways. The subject methods may be carried out in a high humidity environment. By "high humidity" is meant an environment in which the humidity is at least about 86% relative humidity, usually at least about 95% relative humidity and more usually at least about 99% relative humidity. Alternatively, one may apply an evaporation retarding agent, e.g. mineral oil, glycerol solution, polyethylene glycol, etc., over the surface of the deposited sample, e.g. by using a thermal inkjet as described above.

Where desired, following deposition of the desired amount of protein fluid, the individual firing chambers of the heads may be washed and front loaded with another fluid for subsequent fluid deposition. Washing of the head can be accomplished using any convenient protocol, e.g., via front loading and expelling an appropriate wash buffer, one or more times, by backloading and expelling an appropriate wash buffer, etc. In addition, the head may be manually or automatically wiped clean to remove any sample/wash solution left from the previous deposition.

In many embodiments, the head is rapidly washed and reloaded with a new solution, such that the time period starting from the deposition of the first fluid to the loading of the second fluid, i.e., the washing time, is extremely short. In these embodiments, the wash time typically does not exceed about 1 minute, usually does not exceed about 5 minutes and more usually does not exceed about 30 minutes. The wash protocol in these embodiments may include a single flushing or multiple flushes, where the total number of flushes will typically not exceed about 3, usually will not exceed about 5 and more usually will not exceed about 10. The wash fluid employed in these embodiments is typically one that provides for removal of substantially all bipolymers/biomonomers of the first fluid in a minimal number of flushes, where representative fluids of interest include, but are not limited to: saline buffer solution with surfactant, and the like.

The above methods can be substantially, if not completely automated, so that fluid can be loaded and deposited onto a surface automatically. As such, the subject methods are amenable to high throughput applications, e.g., high throughput manufacturing applications. In automated versions of the subject methods, automated devices are employed, where such devices typically include at least a means for precisely controlling the position of the head with respect to an array surface (an XYZ translational mechanism) and for firing the head. Such automated devices include those disclosed in U.S. Pat. Nos. 6,242,266; 6,232,072; and 6,180,351; the disclosures of which are herein incorporated by reference.

The subject methods of depositing a volume of fluid sample onto the surface of a substrate find use in a variety of different applications, and are particularly suited for use in methods where reproducible placement of small volumes of a reagent onto the surface of a solid support are desired. As such, the subject methods find use in the preparation and manufacture of biosensors, microarrays, e.g., genomic and proteomic arrays, microfluidic devices, and the like.

In the course of practicing the subject methods, fluid contacted arrays are produced in which each deposited fluid volume occupies a small area, i.e. spot, on the substrate surface. By small is meant that each fluid sample spot on the array has a diameter that is at least about 1 μm, usually at least about 5 μm and more usually at least about 10 μm and does not exceed about 10 mm, usually does not exceed about 1000 μm and more usually does not exceed about 200 μm.

Because of the subject printheads employed, a plurality of distinct or different fluids can be simultaneously deposited on a substrate surface with great precision, accuracy and reproducibility. As a plurality of distinct fluids can be simultaneously deposited, the number of different fluids simultaneously deposited is typically at least 2, where the number may be at least about 5, at least about 10, at least about 15 or more, where the upper limit may vary greatly, including about 50, about 100, about 200 or higher. By great precision is meant that the fluids can be precisely printed onto a substrate surface so as to produce a high density array of spots, where by high density is meant at least about 1000, usually at least about 2500 and more usually at least about 10,000 spostss/cm$^2$. As the subject methods are reproducible, any variation from array to array produced using a given printhead, as measured by variation of diameter of a given spot, does not exceed about 0.5 fold, and usually does not exceed about 0.25 fold.

A variety of different arrays can be produced according to the subject methods.

Arrays

Also provided by the subject invention are novel arrays of polymeric binding agents produced using the subject printheads, as described above. The subject arrays include at least two distinct polymers that differ by monomeric sequence immobilized on e.g., covalently or non-covalently attached to, different and known locations on the substrate surface. Each distinct polymeric sequence of the array is typically present as a composition of multiple copies of the polymer on the substrate surface, e.g. as a spot on the surface of the substrate. The number of distinct polymeric sequences, and hence spots or similar structures, present on the array may vary, but is generally at least 2, usually at least 5 and more usually at least 10, where the number of different spots on the array may be as a high as 50, 100, 500, 1000, 10,000 or higher, depending on the intended use of the array. The spots of distinct polymers present on the array surface are generally present as a pattern, where the pattern may be in the form of organized rows and columns of spots, e.g. a grid of spots, across the substrate surface, a series of curvilinear rows across the substrate surface, e.g. a series of concentric circles or semi-circles of spots, and the like. The density of spots present on the array surface may vary, but will generally be at least about 10 and usually at least about 100 spots/cm$^2$, where the density may be as high as 10$^6$ or higher, but will generally not exceed about 10$^5$ spots/cm$^2$.

In the broadest sense, the arrays of the subject invention are arrays of polymeric binding agents, where the polymeric binding agents may be any of: peptides, proteins, nucleic acids, polysaccharides, synthetic mimetics of such biopolymeric binding agents, etc. In many embodiments of interest, the arrays are arrays of nucleic acids, including oligonucleotides, polynucleotides, cDNAs, mRNAs, synthetic mimetics thereof, and the like. Where the arrays are arrays of nucleic acids, the nucleic acids may be covalently attached to the arrays at any point along the nucleic acid chain, but are generally attached at one of their termini, e.g. the 3' or 5' terminus. In other embodiments, the arrays are arrays of polypeptides, e.g., proteins or fragments thereof.

Utility

The subject arrays find use in a variety applications, where such applications are generally analyte detection applications in which the presence of a particular analyte in a given sample is detected at least qualitatively, if not quantitatively. Protocols for carrying out such assays are well known to those of skill in the art and need not be described in great detail here. Generally, the sample suspected of comprising the analyte of interest is contacted with an array produced according to the subject methods under conditions sufficient for the analyte to bind to its respective binding pair member that is present on the array. Thus, if the analyte of interest is present in the sample, it binds to the array at the site of its complementary binding member and a complex is formed on the array surface. The presence of this binding complex on the array surface is then detected, e.g. through use of a signal production system, e.g. an isotopic or fluorescent label present on the analyte, etc. The presence of the analyte in the sample is then deduced from the detection of binding complexes on the substrate surface.

Specific analyte detection applications of interest include hybridization assays in which the nucleic acid arrays of the subject invention are employed. In these assays, a sample of target nucleic acids is first prepared, where preparation may include labeling of the target nucleic acids with a label, e.g. a member of signal producing system. Following sample preparation, the sample is contacted with the array under hybridization conditions, whereby complexes are formed between target nucleic acids that are complementary to probe sequences attached to the array surface. The presence of hybridized complexes is then detected. Specific hybridization assays of interest which may be practiced using the subject arrays include: gene discovery assays, differential gene expression analysis assays; nucleic acid sequencing assays, and the like. Patents and patent applications describing methods of using arrays in various applications include: U.S. Pat. Nos. 5,143,854; 5,288,644; 5,324,633; 5,432,049; 5,470,710; 5,492,806; 5,503,980; 5,510,270; 5,525,464; 5,547,839; 5,580,732; 5,661,028; 5,800,992; the disclosures of which are herein incorporated by reference.

Where the arrays are arrays of polypeptide binding agents, e.g., protein arrays, specific applications of interest include analyte detection/proteomics applications, including those described in: U.S. Pat. Nos. 4,591,570; 5,171,695; 5,436,170; 5,486,452; 5,532,128; and 6,197,599; the disclosures of which are herein incorporated by reference; as well as published PCT application Nos. WO 99/39210; WO 00/04832; WO 00/04389; WO 00/04390; WO 00/54046; WO 00/63701; WO 01/14425; and WO 01/40803; the disclosures of the United States priority documents of which are herein incorporated by reference.

In certain embodiments, the subject methods include a step of transmitting data from at least one of the detecting and deriving steps, as described above, to a remote location. By "remote location" is meant a location other than the location at which the array is present and hybridization occur. For example, a remote location could be another location (e.g. office, lab, etc.) in the same city, another location in a different city, another location in a different state, another location in a different country, etc. As such, when one item is indicated as being "remote" from another, what is meant is that the two items are at least in different buildings, and may be at least one mile, ten miles, or at least one hundred miles apart. "Communicating" information means transmitting the data representing that information as electrical signals over a suitable communication channel (for example, a private or public network). "Forwarding" an item refers to any means of getting that item from one location to the next, whether by physically transporting that item or otherwise (where that is possible) and includes, at least in the case of data, physically transporting a medium carrying the data or communicating the data. The data may be transmitted to the remote location for further evaluation and/or use. Any convenient telecommunications means may be employed for transmitting the data, e.g., facsimile, modem, internet, etc.

As such, in using an array made by the method of the present invention, the array will typically be exposed to a sample (for example, a fluorescently labeled analyte, e.g., protein containing sample) and the array then read. Reading of the array may be accomplished by illuminating the array and reading the location and intensity of resulting fluorescence at each feature of the array to detect any binding complexes on the surface of the array. For example, a scanner may be used for this purpose which is similar to the Agilent Microarray scanner available from Agilent Technologies, Palo Alto, Calif. Other suitable apparatus and methods are described in U.S. patent applications: Ser. No. 09/846,125 "Reading Multi-Featured Arrays" by Dorsel et al.; and Ser. No. 09/430,214 "Interrogating Multi-Featured Arrays" by Dorsel et al. As previously mentioned, these references are incorporated herein by reference. However, arrays may be read by any other method or apparatus than the foregoing, with other reading methods including other optical techniques (for example, detecting chemiluminescent or electroluminescent labels) or electrical techniques (where each feature is provided with an electrode to detect hybridization at that feature in a manner disclosed in U.S. Pat. No. 6,221,583 and elsewhere). Results from the reading may be raw results (such as fluorescence intensity readings for each feature in one or more color channels) or may be processed results such as obtained by rejecting a reading for a feature which is below a predetermined threshold and/or forming conclusions based on the pattern read from the array (such as whether or not a particular target sequence may have been present in the sample). The results of the reading (processed or not) may be forwarded (such as by communication) to a remote location if desired, and received there for further use (such as further processing).

Kits

Finally, kits for use in analyte detection assays are provided. The subject kits at least include the arrays of the subject invention. The kits may further include one or more additional components necessary for carrying out the analyte detection assay, such as sample preparation reagents, buffers, labels, and the like.

In addition to above mentioned components, the subject kits typically further include instructions for using the components of the kit to practice the subject methods with the subject devices. The instructions for practicing the subject methods are generally recorded on a suitable recording medium. For example, the instructions may be printed on a substrate, such as paper or plastic, etc. As such, the instructions may be present in the kits as a package insert, in the labeling of the container of the kit or components thereof (i.e., associated with the packaging or subpackaging) etc. In other embodiments, the instructions are present as an electronic storage data file present on a suitable computer readable storage medium, e.g. CD-ROM, diskette, etc. In yet other embodiments, the actual instructions are not present in the kit, but means for obtaining the instructions from a remote source, e.g. via the internet, are provided. An example of this embodiment is a kit that includes a web address where the instructions can be viewed and/or from which the instructions can be downloaded. As with the instructions, this means for obtaining the instructions is recorded on a suitable substrate.

It is evident from the above results and discussion that the subject multi-die printhead assemblies provide a number of benefits. The benefits provided by the subject invention include the provision of a means to make economical multi-reservoir print head assemblies. In addition, the subject printheads provide for array manufacturing protocols that are characterized by increased speed and efficiency, with reduced fluid volume usage and reduced complex adjusting steps required upon printhead replacement. Each of the above advantages provides for substantially reduced cost procedures for making high quality, high density biopolymeric arrays. As such, the subject invention represents a significant contribution to the art.

All publications and patent applications cited in this specification are herein incorporated by reference as if each individual publication or patent application were specifically and individually indicated to be incorporated by reference. The citation of any publication is for its disclosure prior to the filing date and should not be construed as an admission that the present invention is not entitled to antedate such publication by virtue of prior invention.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

What is claimed is:

1. A pulse jet printhead assembly comprising:
   (a) a multiple die printhead comprising:
      (i) an orifice plate comprising a plurality of orifices; and
      (ii) a plurality of printhead dies present on a surface of said orifice plate in operational alignment with said orifices to produce at least one firing chamber; and
   (b) a multiple reservoir housing affixed to said multiple die printhead, said housing further comprising at least one of the following:
      (i) reservoir walls that are sufficiently high to prevent cross-contamination of samples among reservoirs of said housing; or
      (ii) at least one discontinuity at a reservoir housing printhead mating surface that prevents gap formation at the housing printhead interface following adhesive curing.

2. The pulse jet printhead assembly according to claim 1, wherein said assembly comprises from about 2 to about 100 distinct reservoirs.

3. The pulse jet printhead assembly according to claim 1, wherein the ratio of reservoirs to dies in said assembly ranges from about 2 to about 20.

4. The pulse jet printhead assembly according to claim 1, wherein said printhead comprises from 2 to about 10 printhead dies.

5. The pulse jet printhead assembly according to claim 4, wherein said printhead comprises from 2 to 5 printhead dies.

6. The pulse jet printhead assembly according to claim 5, wherein said printhead assembly is a thermal pulse jet printhead assembly.

7. The pulse jet printhead assembly according to claim 1, wherein each reservoir has walls that are sufficiently high to prevent cross-contamination of samples among reservoirs of said housing.

8. The pulse jet printhead assembly according to claim 1, wherein said housing comprises at least one excess adhesive flow path.

9. The pulse jet printhead assembly according to claim 1, wherein said housing comprises at least one discontinuity at a reservoir housing printhead mating surface that prevents gap formation at the housing printhead interface following adhesive curing.

10. The pulse jet printhead assembly according to claim 1, wherein at least one of said reservoirs comprises a fluid that includes a biopolymer or precursor thereof.

11. The pulse jet printhead assembly according to claim 1, wherein: (i) each reservoir of said multiple reservoir housing has walls that are sufficiently high to prevent cross-contamination of samples among reservoirs; (ii) said housing comprises at least one excess adhesive flow path; (iii) said housing comprises at least one discontinuity at a reservoir housing printhead mating surface that prevents gap formation at the housing printhead interface following adhesive curing; and said pulse jet printhead assembly is a thermal pulse jet printhead assembly.

12. The thermal pulse jet printhead assembly according to claim 11, wherein said multiple reservoir housing comprises from about 2 to about 100 distinct reservoirs.

13. The thermal pulse jet printhead assembly according to claim 11, wherein the ratio of reservoirs in said housing to dies on said printhead ranges from about 2 to about 20.

14. The thermal pulse jet printhead assembly according to claim 11, wherein said printhead comprises from 2 to about 10 printhead dies.

15. The thermal pulse jet printhead assembly according to claim 14, wherein said printhead comprises from 2 to 5 printhead dies.

16. The thermal pulse jet printhead assembly according to claim 15, wherein said printhead comprises 3 printhead dies.

17. The thermal pulse jet printhead assembly according to claim 11, wherein at least one of said reservoirs comprises a fluid that includes a biopolymer or precursor thereof.

18. The thermal pulse jet printhead assembly according to claim 17, wherein said biopolymer is selected from the group consisting of polypeptides and nucleic acids.

19. The thermal pulse jet printhead assembly according to claim 17, wherein said precursor thereof is selected from the group consisting of amino acids and nucleotides.

20. A method of depositing a volume of a fluid containing a biopolymer or precursor thereof on a surface of a substrate, said method comprising:
   (a) positioning a pulse jet printhead assembly according to claim 1 in opposing relation to said substrate surface; and
   (b) actuating said pulse jet printhead assembly to expel a volume of said fluid onto said substrate surface.

21. The method according to claim 20, wherein said method further comprises depositing a volume of a second fluid containing a biopolymer or precursor thereof onto said substrate surface.

22. The method according to claim 21, wherein said method is a method of making a biopolymer array.

23. The method according to claim 20, wherein said biopolymer is selected from the group consisting of polypeptides and nucleic acids.

24. The method according to claim 20, wherein said precursor is selected from the group consisting of amino acids and nucleotides.

25. An automated pulse jet printing system, said system comprising a pulse jet printhead assembly according to claim 1.

26. A multiple reservoir printhead housing for use in a pulse jet printhead assembly according to claim 1, wherein said multiple reservoir housing is configured to be mounted on a multiple printhead die printhead in a manner that maintains orifice to orifice spacing of an orifice plate component of said printhead.

27. The multiple reservoir printhead housing according to claim 26, wherein each reservoir element of said multiple reservoir housing has walls that are sufficiently high to prevent cross-contamination of samples among reservoirs of a printhead assembly that includes said housing.

28. The multiple reservoir printhead housing according to claim 26, wherein said housing comprises at least one excess adhesive flow path.

29. The multiple reservoir printhead housing according to claim 26, wherein said housing comprises at least one discontinuity at a reservoir housing printhead mating surface that prevents gap formation following adhesive curing at the housing printhead interface in the printhead assembly.

30. The multiple reservoir printhead housing according to claim 26, wherein said multiple reservoir housing comprises from about 1 to about 100 distinct reservoirs.

* * * * *